United States Patent
Chu

(10) Patent No.: US 8,909,195 B2
(45) Date of Patent: Dec. 9, 2014

(54) MOBILE TERMINAL AND METHOD OF SELECTING LOCK FUNCTION

(75) Inventor: Se Youp Chu, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1004 days.

(21) Appl. No.: 12/229,835

(22) Filed: Aug. 27, 2008

(65) Prior Publication Data

US 2009/0061823 A1    Mar. 5, 2009

(30) Foreign Application Priority Data

Aug. 31, 2007   (KR) .................. 10-2007-0088621

(51) Int. Cl.
*H04M 1/66* (2006.01)
*G06F 3/044* (2006.01)
*G06F 3/0488* (2013.01)

(52) U.S. Cl.
CPC ............ *H04M 1/66* (2013.01); *H04M 2250/22* (2013.01); *G06F 3/044* (2013.01); *G06F 2203/04808* (2013.01); *G06F 3/0488* (2013.01)
USPC .......................................... 455/411; 345/173

(58) Field of Classification Search
CPC ............... G06F 3/0488; G06F 3/0416; G06F 2203/04808; G06F 3/04886; G06F 3/017; G06F 3/0414; H04M 2250/22; H04M 1/7258; H03K 17/9622; H03K 2017/9613; H03K 2217/96031; H03K 2217/96062; H03K 2217/960755
USPC .............. 455/403, 410, 411, 418, 550.1, 566, 455/557; 345/156, 173–178
See application file for complete search history.

(56) References Cited

U.S. PATENT DOCUMENTS

| | | | |
|---|---|---|---|
| 2005/0079896 A1* | 4/2005 | Kokko et al. | 455/566 |
| 2006/0026536 A1* | 2/2006 | Hotelling et al. | 715/863 |
| 2007/0049358 A1 | 3/2007 | Kang et al. | |
| 2007/0150842 A1* | 6/2007 | Chaudhri et al. | 715/863 |
| 2007/0152984 A1* | 7/2007 | Ording et al. | 345/173 |
| 2008/0024459 A1* | 1/2008 | Poupyrev et al. | 345/173 |
| 2008/0105470 A1* | 5/2008 | Van De Ven et al. | 178/18.01 |
| 2009/0006958 A1* | 1/2009 | Pohjola et al. | 715/710 |

FOREIGN PATENT DOCUMENTS

| | | |
|---|---|---|
| KR | 10-2006-0080060 | 7/2006 |
| KR | 10-2007-0024165 | 3/2007 |
| KR | 10-2007-0027191 | 3/2007 |

OTHER PUBLICATIONS

Decision of Patent dated Jul. 24, 2014 in connection with Korean Patent Application No. 10-2007-0088621, 4 pages.

* cited by examiner

*Primary Examiner* — Chuong A Ngo

(57) ABSTRACT

A mobile terminal and a method of selecting a lock function thereof are provided. The method of selecting a lock function of a mobile terminal having a touch screen includes: measuring, when at least one touch occurs on the touch screen, at least one of a pressure, a current, and a capacitance of an area of the touch screen in which the touch occurs; and selecting, if at least one of the measured pressure, current, and capacitance is greater than or equal to a preset value, a lock function. Thus, by touching the touch screen in such a manner that a high current or capacitance may be measured in a specific area of the mobile terminal, a user can easily perform a desired function, thereby improving user convenience.

19 Claims, 7 Drawing Sheets

MOBILE TERMINAL AND METHOD OF SELECTING LOCK FUNCTION

CROSS-REFERENCE TO RELATED APPLICATION(S) AND CLAIM OF PRIORITY

The present application claims priority to an application entitled "PORTABLE TERMINAL AND METHOD FOR PERFORMING ORDER THEREOF" filed in the Korean Intellectual Property Office on Aug. 31, 2007 and assigned Serial No. 2007-0088621, the contents of which are incorporated herein by reference.

TECHNICAL FIELD OF THE INVENTION

The present invention relates to a mobile terminal and a method of selecting a lock function thereof and, more particularly, to a mobile terminal and a method of selecting a lock function thereof in which, if a measured pressure, current, or capacitance of an area of a touch screen in which a touch occurs is greater than or equal to a preset value, a lock function is selected.

BACKGROUND OF THE INVENTION

In general, a touch screen of a terminal provides a user interface through which a user can input information or an instruction to the terminal through a touch. The touch screen is applied to various mobile terminals such as a mobile phone, smart phone, palmtop computer, and personal digital assistant (PDA). Further, nowadays, as a size and weight of a terminal decrease, a size and weight of a touch screen are also decreasing.

Unlike a conventional push button type key input unit, a mobile terminal having a touch screen recognizes even a slight pressure as a touch input. However, there is a problem that a key may thereby be unintentionally input.

In order to select a lock function, which is a function that prevents further functions from being selected, or a silent mode (that is, a mode in which no sound is emitted) function of the mobile terminal, a user searches for and selects the function among menus provided in the mobile terminal. Therefore, in order to select a desired function, the user must input a key several times.

SUMMARY OF THE INVENTION

To address the above-discussed deficiencies of the prior art, it is a primary object to provide a mobile terminal and a method of selecting a lock function thereof in which, if a measured pressure, current, or capacitance of an area of a touch screen in which a touch occurs is greater than or equal to a preset value, a lock function is selected.

The present invention further provides a mobile terminal and a method of selecting a lock function thereof in which, if a strong current or capacitance is measured in a partial area of a touch screen, if a current or capacitance is simultaneously measured in several areas of the touch screen, or if a current or capacitance is measured within a wide area of the touch screen, a lock function is selected.

The present invention further provides a mobile terminal and a method of selecting a lock function thereof, whereby if a user's face and a touch screen contact each other in a communication mode, a lock function of the mobile terminal is selected.

In accordance with an aspect of the present invention, a method of selecting a lock function of a mobile terminal having a touch screen includes: measuring, when at least one touch occurs on the touch screen, at least one of a pressure, a current, and a capacitance of an area of the touch screen in which the touch occurs; and selecting, if at least one of the measured pressure, current, and capacitance is greater than or equal to a preset value, a lock function.

In accordance with another aspect of the present invention, a mobile terminal includes: a touch screen; a measurement unit for measuring, when at least one touch occurs on the touch screen, at least one of a pressure, a current, and a capacitance of an area of the touch screen in which the touch occurs; and a controller for selecting, if at least one of the measured pressure, current, and capacitance is greater than or equal to a set value, a lock function.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

A mobile terminal according to exemplary embodiments of the present invention has a touch screen and may be any information communication appliance or multimedia appliance, such as a mobile terminal, mobile phone, wired/wireless phone, portable multimedia player (PMP), PDA, smart phone, notebook, and PC, and applications thereof.

Figure 1:
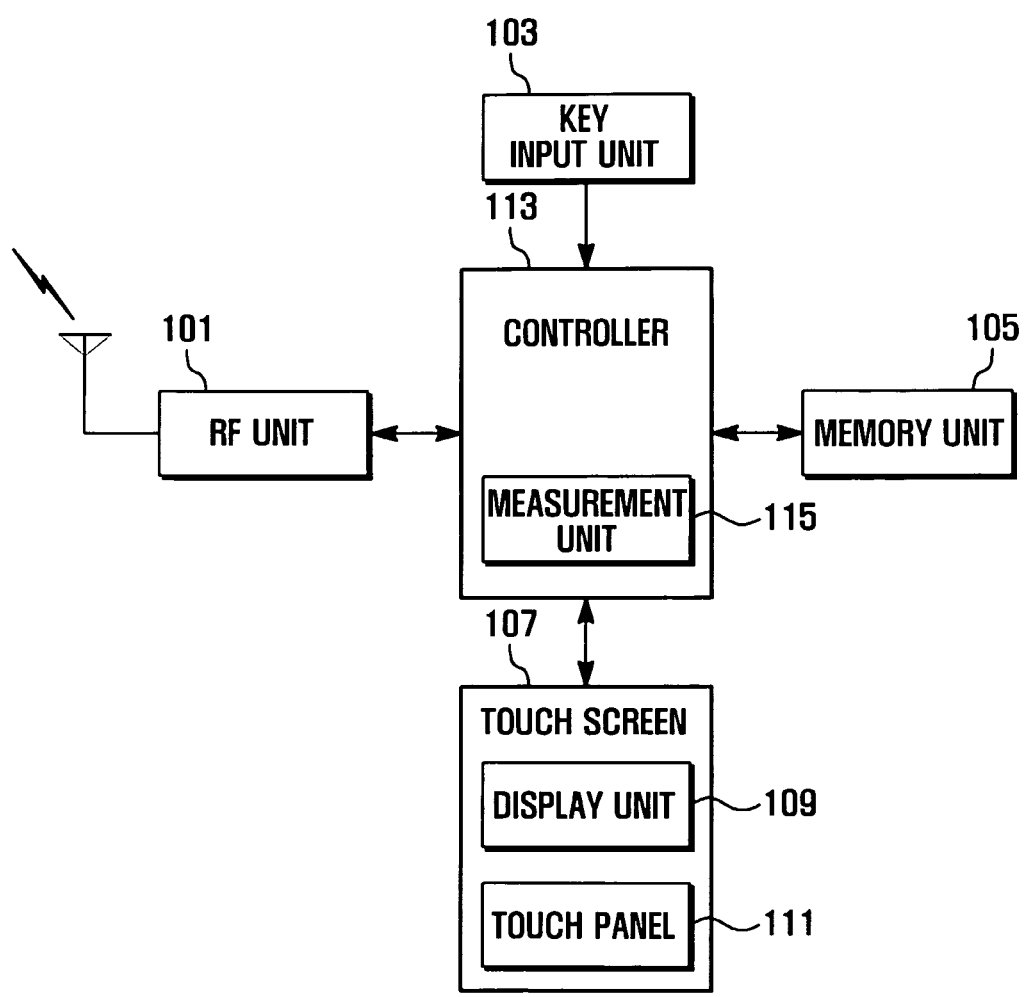
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, the mobile terminal includes a radio frequency (RF) unit 101, a key input unit 103, a memory unit 105, a touch screen 107, and a controller 113.

The RF unit 101 performs a wireless communication function of the mobile terminal. The RF unit 101 includes an RF transmitter for up-converting a frequency of a signal to be transmitted and amplifying the signal, and an RF receiver for low-noise amplifying a received signal and down-converting a frequency of the signal. The RF unit 101 may perform communication with another mobile terminal.

The key input unit 103 is used for inputting a user's manipulation signal for controlling operation of the mobile terminal. The key input unit 103 generates a manipulation signal, such as inputting, searching for, and calling a phone number of a mobile terminal of another party, and terminating a call with another mobile terminal, in order to perform communication.

The memory unit 105 stores programs and information necessary for operation of the mobile terminal. The memory unit 105 stores various functions provided for in the mobile terminal. The memory unit 105 also stores a preset value of current or capacitance for comparing, when a touch occurs on the touch screen 107, with a current or capacitance of an area where the touch occurs measured by the measurement unit 115. Here, the preset value may be preset by the provider of the mobile terminal, or may be set and stored by the user.

The touch screen 107 includes a display unit 109 and a touch panel 111. The display unit 109 displays a state of the mobile terminal. The display unit 109 may be a liquid crystal display (LCD) device, including an LCD controller, memory for storing display data, and LCD display element. The touch panel 111 is mounted on a surface of the display unit 109 and includes a touch detection unit and a signal converter. When a touch occurs on the touch panel 111, the touch detection unit detects a change in a value of a physical characteristic and thereby detects occurrence of the touch. Further, the signal converter converts the change of the physical characteristic to a touch signal. That is, the touch detection unit measures a pressure generated by a touch, detects a pressure generated by a touch and measures a current or capacitance generated thereby, or measures a current or capacitance generated by multiple touches or by a touch in a wide area of the touch panel 111.

When a pressure, current, or capacitance generated by the occurrence of a touch is greater than or equal to a preset value, the touch screen 107 displays selection of a preset function. For example, when the preset function is a lock function, the touch screen 107 displays selection of the lock function of the mobile terminal, and when the preset function is a silent mode function, the touch screen 107 displays selection of the silent mode function of the mobile terminal. The present exemplary embodiment illustrates two functions; however, the present invention is not limited thereto.

The controller 113 controls general operations of the mobile terminal. The controller 113 controls selection of a function according to the present exemplary embodiment. The controller 113 includes a measurement unit 115. When a touch occurs on the touch screen 107, the controller 113 instructs the measurement unit 115 to measure a pressure, current, or capacitance of an area in which the touch occurs. Here, the measurement unit 115 includes, for example, a current measurement unit for measuring current or a capacitance measurement unit for measuring capacitance.

Figure 5B:
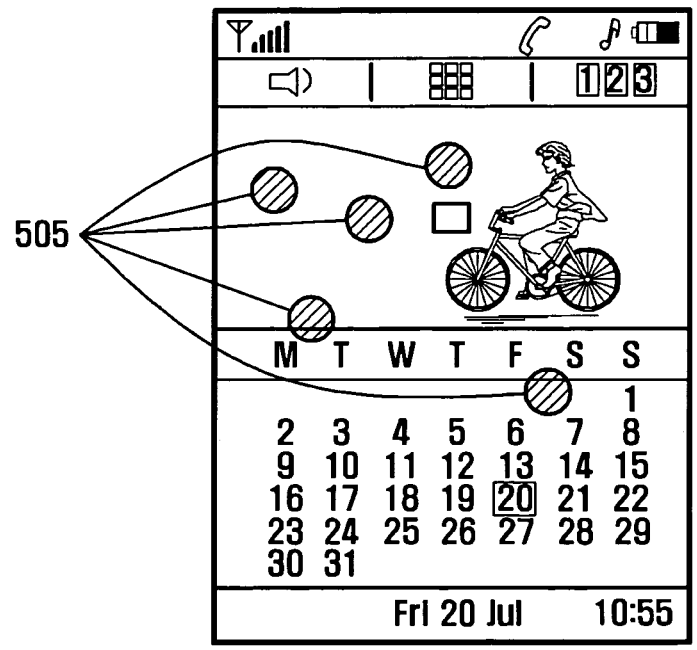
FIG. 5B illustrates an example of a touch screen in which a touch by the user occurs in several areas of the touch screen simultaneously.
Figure 6A:
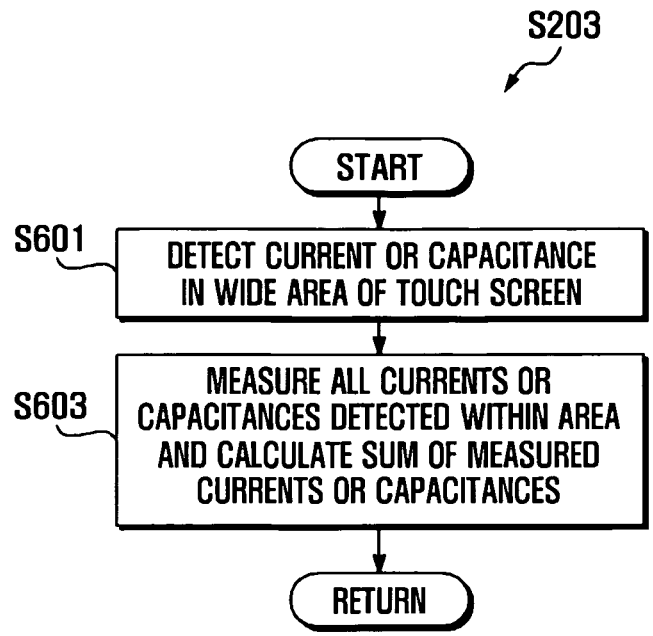
FIG. 6A is a flowchart illustrating a process of measuring a detected current or capacitance within a wide area of a touch screen and calculating a sum of the measured currents or capacitances in the method of FIG. 2.
Figure 6B:
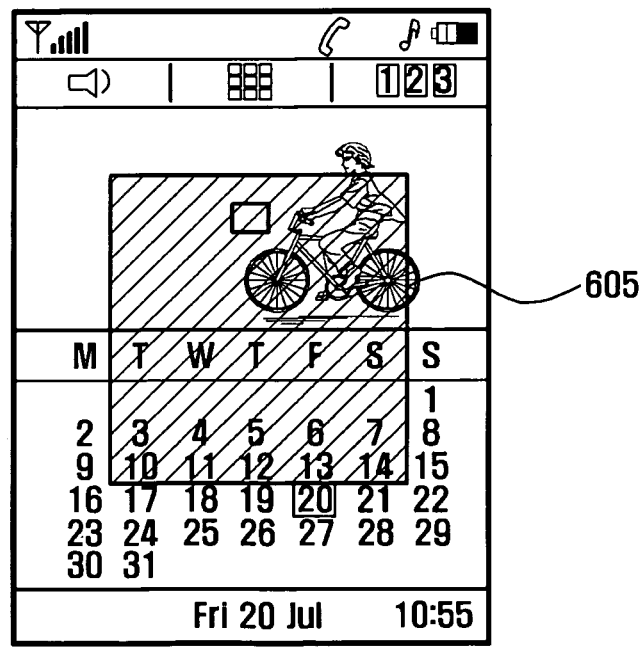
FIG. 6B illustrates an example of a touch screen in which a touch by the user occurs in a wide area of the touch screen.

An area in which a touch occurs may be a partial area of the touch screen 107 (see FIG. 4B), several areas of the touch screen 107 (see FIG. 5B), or a wide area of the touch screen 107 (see FIG. 6B). When the user contacts the touch screen 107 with a finger or a stylus to touch the touch screen, a partial area indicates a single touched area. Several areas indicate several partial areas (i.e., several touched areas). The wide area indicates a case where more than half of an entire area of the touch screen 107 is a touched area. However, in other embodiments, the area in which a touch occurs is not limited to a partial area, several areas, and a wide area.

A touch in the partial area occurs when a user touches the touch screen 107 with a strong pressure using a finger or stylus. That is, the touch occurs when the user touches the partial area of the touch screen 107 with a strong pressure for a predetermined time period using a finger or stylus. In this case, the measurement unit 115 measures a current or capacitance according to a pressure detected by the touch detection unit.

A touch in several areas occurs when the user simultaneously touches the touch screen 107 using more than one finger. In this case, the measurement unit 115 measures a current or capacitance of each area in which a touch occurs and calculates the sum of the measured currents or capacitances.

A touch in a wide area occurs when the user simultaneously touches a wide area using, for example, a palm of the hand, or the face, or when the user places the mobile terminal such that the touch screen 107 contacts a work surface (for example, a table). In this case, the measurement unit 115 measures a current or capacitance at measuring points within an area in which a touch occurs and calculates the sum of the measured currents or capacitances.

The controller 113 determines whether a current or capacitance measured by the measurement unit 115 is greater than or equal to a preset value stored in the memory unit 105. If a current or capacitance measured by the measurement unit 115 is greater than or equal to a preset value stored in the memory unit 105, the controller 113 selects a preset function. Here, the preset function may be a lock function or a silent mode function. When the mobile terminal is in a communication mode, if a touch occurs on the touch screen 107 and a current or capacitance measured by the measurement unit 115 is greater than or equal to a preset value, the controller 113 selects a preset function of the mobile terminal. When a partial area of the touch screen 107 is touched by the user with a strong pressure, when a plurality of fingers simultaneously touch the touch screen 107, when a palm or a face touches the touch screen 107, or when the touch screen 107 of the mobile terminal contacts a surface (for example, a table), the controller 113 selects a preset function.

As described above, in the present exemplary embodiment, the measurement unit 115 for measuring a current or capacitance of an area on the touch screen 107 in which a touch occurs, whereby a preset function is selected, is included in the controller 113; however, the present invention is not limited thereto. The measurement unit 115 may be separated from the controller 113 and perform the above measurement functions. Further, the measurement unit 115 may measure a temperature or a voltage, as well as, or instead of, measuring a current or capacitance.

Figure 2:
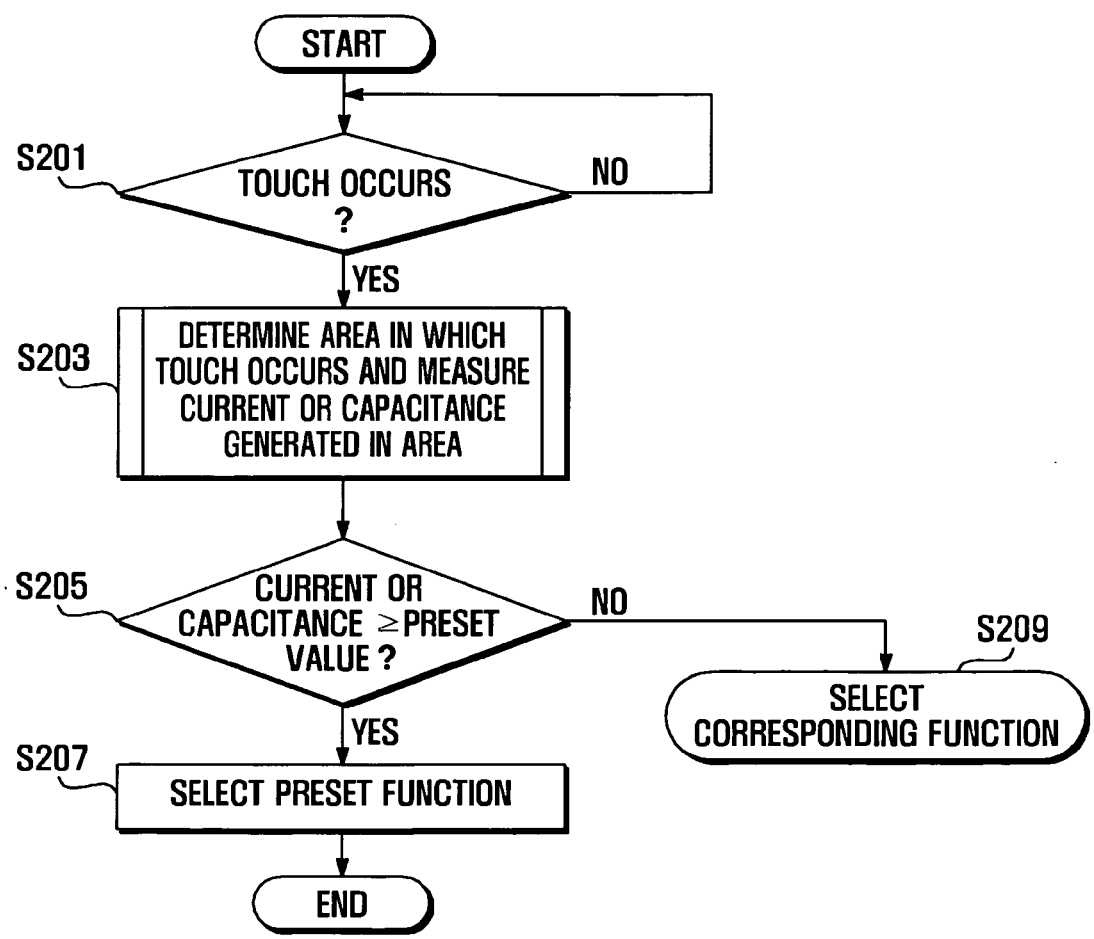
FIG. 2 is a flowchart illustrating a method of selecting a lock function of a mobile terminal according to another exemplary embodiment of the present invention.
Figure 3A:
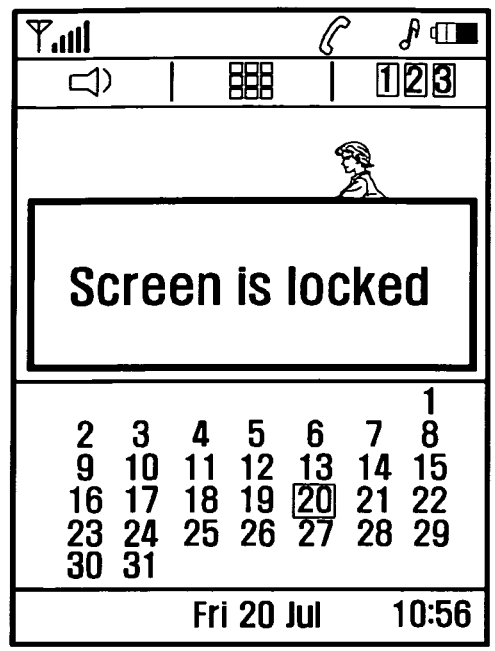
FIGS. 3A and 3B illustrate examples of a touch screen in the method of FIG. 2.
Figure 3B:
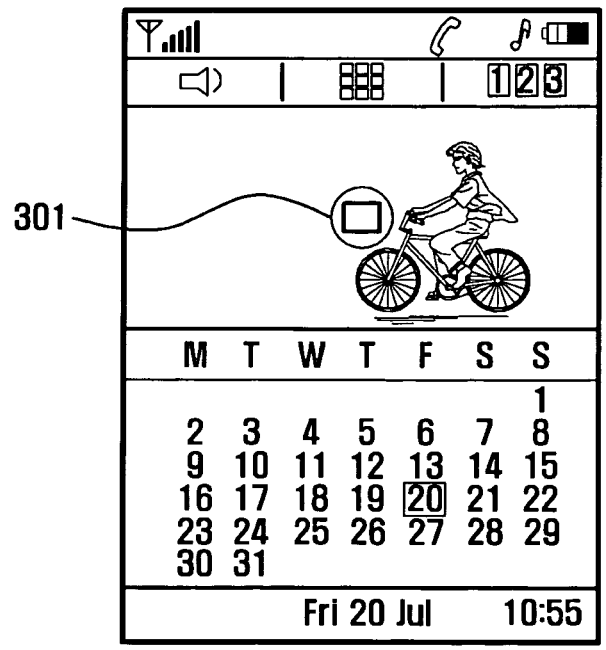

FIG. 2 is a flowchart illustrating a method of selecting a function of a mobile terminal according to another exemplary embodiment of the present invention. FIGS. 3A and 3B illustrate examples of a touch screen in the method of FIG. 2.

Referring to FIG. 2, the controller 113 determines whether a touch occurs on the touch screen 107 (S201). This step can be performed in any mode (for example, a communication mode, a standby mode, or a music reproducing mode) of a mobile terminal.

If a touch occurs on the touch screen 107, the controller 113 determines an area in which a touch occurs and instructs the measurement unit 115 to measure a current or capacitance generated in the area (S203).

The present embodiment exemplifies that the measurement unit 115 measures a current or capacitance of the touch occurrence area; however, the present invention is not limited thereto.

The controller 113 determines whether the current or capacitance measured by the measurement unit 115 is greater than or equal to a preset value stored in the memory unit 105 (S205). That is, the controller 113 determines whether a current or capacitance greater than or equal to the preset value is generated by a touch occurring in the touch screen 107. The preset value is set such that a current or capacitance generated when a partial area of the touch screen 107 is strongly touched, when touches occur simultaneously in a plurality of areas, or when a touch occurs in a wide area, is greater than or equal to the preset value.

If the current or capacitance measured by the measurement unit 115 is greater than or equal to a preset value stored in the memory unit 105, the controller 113 selects a preset function (S207). Here, the preset function may be a lock function or a silent mode function.

FIG. 3A illustrates an example of a touch screen in which a lock function is selected. As shown in FIG. 3A, when a touch occurs on the touch screen 107 and the current or capacitance of the area in which the touch occurs is greater than or equal to a preset value, the controller 113 selects a lock function of the mobile terminal.

If the current or capacitance measured by the measurement unit 115 is less than a preset value stored in the memory unit 105 at step S205, the controller 113 selects a corresponding function (S209). For example, if the user touches the touch screen 107 such that the touch does not generate a strong current or capacitance (for example, by performing a gentle touch), the user can select a desired function. In the example shown in FIG. 3B, the user can select a desired function by gently touching a shortcut 301 displayed in a standby mode.

Figure 4A:
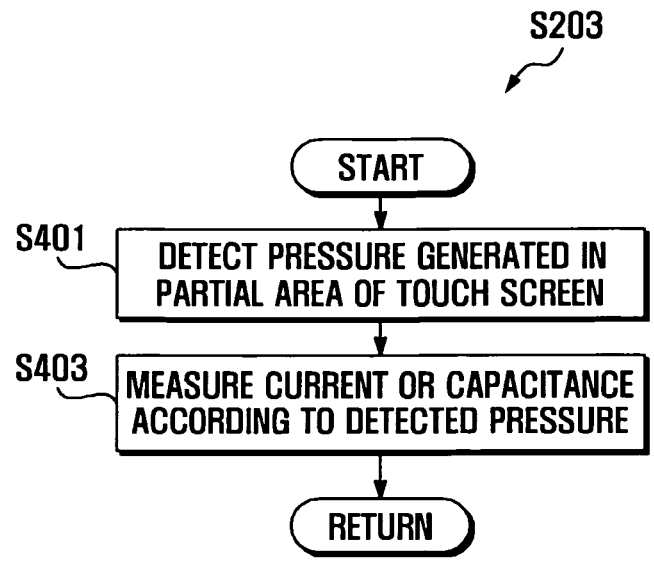
FIG. 4A is a flowchart illustrating a process of measuring a detected current or capacitance in a partial area of a touch screen in the method of FIG. 2.

FIG. 4A is a flowchart illustrating a process of measuring the detected current or capacitance in a partial area of a touch screen at step S203 in the method of FIG. 2.

Referring to FIG. 4A, the controller 113 detects a pressure in a partial area of the touch screen 107 (S401).

Figure 4B:
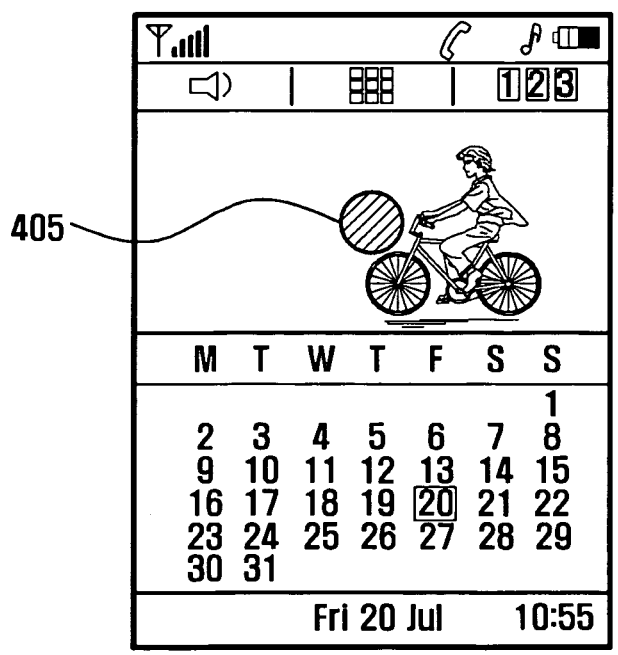
FIG. 4B illustrates an example of a touch screen in which a strong touch by the user occurs in a partial area of the touch screen.

FIG. 4B illustrates an example of the touch screen 107 in which a strong touch by the user occurs in a partial area of the touch screen 107.

As shown in FIG. 4B, when the user strongly touches a partial area 405, the touch detection unit detects a pressure. Here, the user touches the partial area 405 of the touch screen 107 with a strong pressure using a finger.

The controller 113 instructs the measurement unit 115 to measure the detected pressure (S403). The controller 113 instructs the measurement unit 115 to measure a current or capacitance generated by the detected pressure (S403), and the process returns to step S205.

Figure 5A:
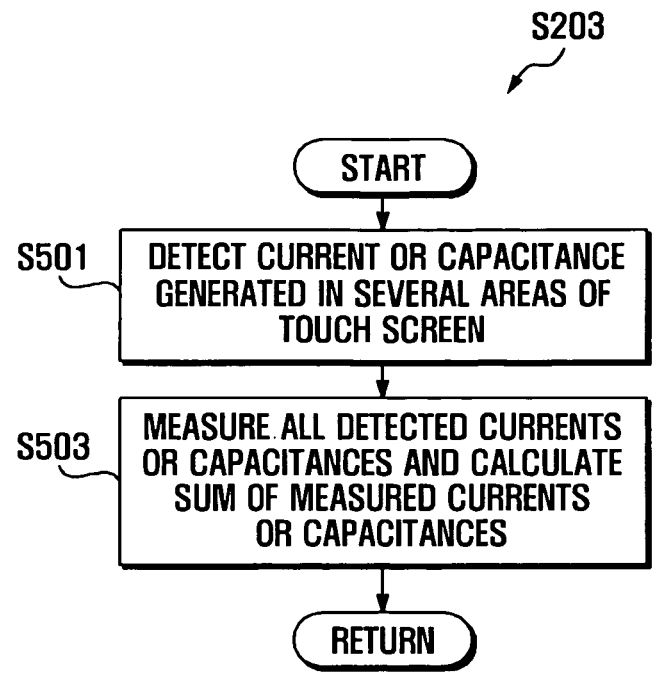
FIG. 5A is a flowchart illustrating a process of measuring a detected current or capacitance in several areas of a touch screen and calculating a sum of the measured currents or capacitances in the method of FIG. 2.

FIG. 5A is a flowchart illustrating a process of measuring a detected current or capacitance in several areas of a touch screen and calculating the sum of the measured currents or capacitances at step S203 in the method of FIG. 2.

Referring to FIG. 5A, the controller 113 detects a current or capacitance generated in several areas of the touch screen 107 (S501).

FIG. 5B illustrates an example of the touch screen 107 in which a touch by the user occurs in several areas of the touch screen 107 simultaneously.

As shown in FIG. 5B, the user may simultaneously touch several areas 505. That is, the user may simultaneously touch the touch screen 107 with several fingers.

The controller 113 instructs the measurement unit 115 to measure the detected current or capacitance (S503). The measurement unit 115 measures a current or capacitance of each area 505 in which a touch occurs and calculates the sum of the measured currents or capacitances. The controller 113 instructs the measurement unit 115 to measure the current or capacitance, and the process returns to steps S205.

Instead of measuring a current or capacitance directly, the touch detection unit may simultaneously detect a pressure generated in several areas of the touch screen 107, and the measurement unit 115 measures a current or capacitance generated by the pressure.

FIG. 6A is a flowchart illustrating a process of measuring a detected current or capacitance within a wide area of a touch screen and calculating a sum of the measured currents or capacitances at step S203 in the method of FIG. 2.

Referring to FIG. 6A, the controller 113 detects a current or capacitance generated in a wide area of the touch screen 107 (S601).

FIG. 6B illustrates an example of the touch screen 107 in which a touch by the user occurs in a wide area of the touch screen 107.

As shown in FIG. 6B, the user may simultaneously touch a wide area 605. This process may be performed when the user contacts the touch screen 107 using a palm or when the touch screen 107 contacts a face in a communication mode. The process may also be performed by placing the mobile terminal such that the touch screen 107 contacts a surface (for example, a table).

The controller 113 instructs the measurement unit 115 to measure the detected current or capacitance and to calculate the sum of the measured currents or capacitances (S603).

The measurement unit 115 measures all currents or capacitances detected at all measuring points within an area 605 in which a touch occurs and calculates the sum of the measured currents or capacitances. The process then returns to step S205, as described above. Instead of measuring a current or capacitance directly, the touch detection unit may detect a pressure occurring within a wide area of the touch screen 107, and the measurement unit 115 measures a current or capacitance generated by the pressure.

Figure 7:
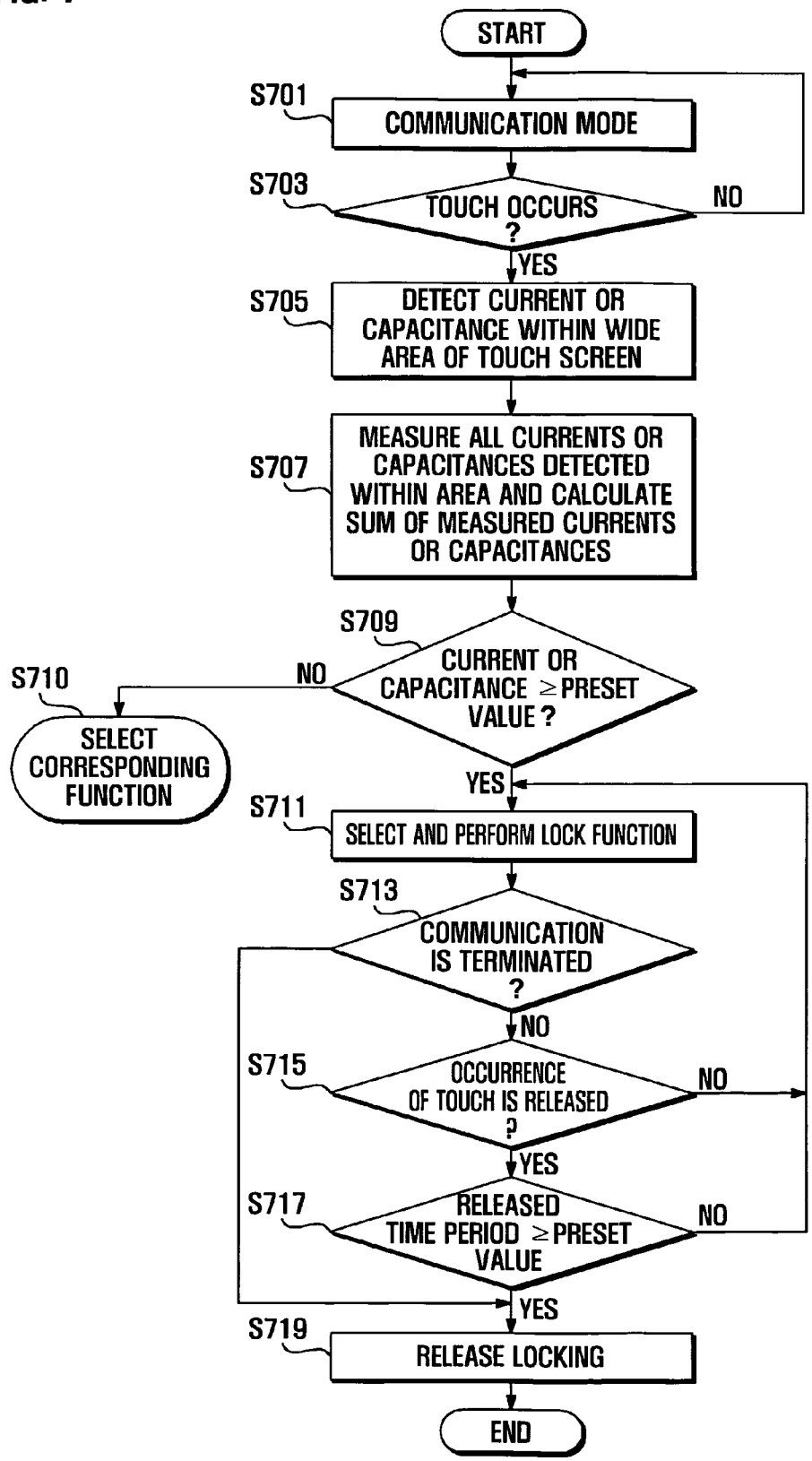
FIG. 7 is a flowchart illustrating a method of selecting a lock function in a communication mode of a mobile terminal according to another exemplary embodiment of the present invention.

FIG. 7 is a flowchart illustrating a method of selecting a lock function in a communication mode of a mobile terminal according to another exemplary embodiment of the present invention.

Referring to FIG. 7, when the mobile terminal is in a communication mode (S701), the controller 113 determines whether a touch occurs on the touch screen 107 (S703).

If a touch occurs on the touch screen 107, the controller 113 detects a current or capacitance generated in a wide area of the touch screen 107 (S705). Referring to FIGS. 6A and 6B, when a touch occurs in a wide area of the touch screen 107, the controller 113 detects the touch. For example, when the mobile terminal is in a communication mode, a user's face may be touched on the touch screen 107.

The controller 113 instructs the measurement unit 115 to measure a current or capacitance generated at measuring points within the wide area in which the touch occurs and calculates the sum of the measured currents or capacitances (S707).

The controller 113 determines whether the current or capacitance measured by the measurement unit 115 is greater than or equal to a preset value stored in the memory unit 105 (S709).

When a touch occurs in a wide area (i.e., in more than a half of an entire area of the touch screen 107) at step S705, the measured current or capacitance may be greater than or equal to a preset value.

If the measured current or capacitance is greater than or equal to a preset value, the controller 113 selects and performs a lock function of the mobile terminal (S711). Here, the preset function is a lock function; however, the present invention is not limited thereto.

FIG. 3A illustrates an example of a screen in which a lock function is selected and performed.

The controller 113 determines whether communication is terminated (S713). If communication is terminated, the controller 113 releases locking of the mobile terminal (S719) and terminates communication.

If communication is not terminated at step S713, the controller 113 determines whether occurrence of a touch is released (S715). When a lock function of the mobile terminal is selected by touching a face on the touch screen 107 while performing communication with the mobile terminal, the user can release a lock function thereof by releasing the touch in order to select another function of the mobile terminal. For example, the user can transmit a message or search for a phone number while performing communication with the mobile terminal.

If occurrence of a touch is released, the controller 113 determines whether a released time period is greater than or equal to a preset time period (S717). The user may release a touch in order to select another function while performing communication. Therefore, the controller 113 determines whether a release time period is greater than or equal to a preset period in order to recognize release of a touch for performing a specific function.

If a release time period is greater than or equal to a preset period, the controller 113 releases locking of the mobile terminal (S719).

In the present exemplary embodiment, when a touch occurs, by measuring a current or capacitance generated in a touch screen though a measurement unit, a preset function is selected; however, the present invention is not limited thereto.

In the present exemplary embodiment, when a touch occurs, a current or capacitance of an area in which the touch occurs is measured; however, the present invention is not limited thereto. For example, by measuring a temperature, or a voltage of an area in which a touch occurs and determining whether the measured value is greater than or equal to a preset value, a preset function can be selected.

As described above, according to the present invention, when a high current or capacitance is measured in a specific area (for example, a partial area, several areas, or a wide area) of a mobile terminal, by selecting a preset function (for example, a lock function or a silent mode function), a user can easily perform a desired function of a mobile terminal, and thus user convenience can be improved.

When a user touches by strongly pressing a partial area of a touch screen using a finger, simultaneously touches several areas of a touch screen, or touches a wide area by using a palm or by placing the mobile terminal such that the touch screen contacts a surface (for example, a table), the user can easily select a desired function (for example, a lock function or a silent mode function) of the mobile terminal.

Particularly, when the mobile terminal is in a communication mode, if the user's face and the touch screen of the mobile terminal contact each other, a touch occurs in a wide area of the touch screen, and thus a current or capacitance higher than a preset value is detected, and an erroneous operation can be prevented by locking the mobile terminal while communicating with the mobile terminal.

Further, when the user is in a meeting or when the mobile terminal is in a music reproducing mode, by simply placing the mobile terminal such that the touch screen contacts a surface (for example, a table), a mode of the mobile terminal can be changed to a locking mode or a silent mode and thus user convenience can be improved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of initiating a lock function of a mobile terminal having a touch screen, the method comprising:
    detecting, when a plurality of touches occur on the touch screen, whether the plurality of touches occur on a predetermined area of the touch screen;
    measuring at least one of a pressure, a current, or a capacitance at a plurality of points corresponding to the plurality of touches;
    calculating at least one of each sum of the pressure, the current, or the capacitance measured at the plurality of points; and
    initiating a lock function when the at least one of the each sum is greater than or equal to a preset value.

2. The method of claim 1 further comprising:
    changing a mode of the mobile terminal to a silent mode after initiating the lock function.

3. The method of claim 1, wherein measuring at least one of the pressure, the current, and the capacitance at the plurality of points comprises:
    detecting the pressure at the plurality of points in which the plurality of touches occur and measuring at least one of the current and the capacitance according to the detected pressure.

4. The method of claim 1, wherein each of the plurality of points within the predetermined area of the touch screen correspond to a location of one of the plurality of touches.

5. The method of claim 1, wherein measuring at least one of the pressure, the current, or the capacitance at the plurality of points within the predetermined area is performed when the mobile terminal is in a communication mode.

6. The method of claim 5 further comprising:
displaying, when the mobile terminal is in the communication mode, available menus on the touch screen when at least one of the measured pressure, current, and capacitance is less than or equal to a preset value.

7. A mobile terminal comprising:
a touch screen including a predetermined area, the touch screen configured to detect a plurality of touches;
a measurement unit configured to measure at least one of a pressure, a current, or a capacitance at a plurality of points corresponding to the plurality of touches; and
a controller configured to calculate at least one of each sum of the pressure, the current, or the capacitance measured at the plurality of points and initiate a lock function when the at least one of the each sum is greater than or equal to a preset value.

8. The mobile terminal of claim 7, wherein the controller is further configured to change a mode of the mobile terminal to a silent mode after initiating the lock function.

9. The mobile terminal of claim 7, wherein the measurement unit is further configured to detect a pressure at the plurality of points where the plurality of touches occur and measure at least one of a current and a capacitance according to the detected pressure.

10. The mobile terminal of claim 7, wherein each of the plurality of points within the predetermined area of the touch screen correspond to a location of one of the plurality of touches.

11. The mobile terminal of claim 7, further comprising:
a radio frequency (RF) unit configured to perform wireless communication with another terminal,
wherein, when the mobile terminal is in a communication mode using the RF unit, the controller drives the measurement unit.

12. The mobile terminal of claim 11, wherein the controller is further configured to instruct the touch screen to display available menus on the touch screen when at least one of the measured pressure, current, or capacitance is less than or equal to a preset value in a communication mode.

13. A method of initiating a preset function of a mobile terminal having a touch screen, the method comprising:
detecting, when a plurality of touches occur on the touch screen, whether the plurality of touches occur on a predetermined area of the touch screen;
measuring at least one of a pressure, a current, or a capacitance at each of a plurality of points corresponding to the plurality of touches;
calculating at least one of each sum of the measured pressures at each of the plurality of points, the measured currents at each of the plurality of points, or the measured capacitances at each of the plurality of points; and
initiating the preset function when the at least one of the each sum is greater than or equal to a preset value.

14. The method of claim 13, wherein the preset function is a lock function.

15. The method of claim 13 further comprising:
changing a mode of the mobile terminal to a silent mode after initiating the preset function.

16. The method of claim 13, wherein measuring at least one of the pressure, the current, or the capacitance at each of the plurality of points of the touch screen in which the plurality of touches occur comprises:
detecting a pressure of an area of the touch screen in which the plurality of touches occur; and
measuring at least one of a current and a capacitance according to the detected pressure.

17. The method of claim 13, wherein each of the plurality of points within the predetermined area of the touch screen correspond to a location of one of the plurality of touches.

18. The method of claim 13, wherein measuring at least one of the pressure, the current, or the capacitance at each of the plurality of points on the predetermined area is performed when the mobile terminal is in a communication mode.

19. The method of claim 18 further comprising:
displaying, when the mobile terminal is in the communication mode, available menus on the touch screen when at least one of the measured pressure, current, and capacitance is less than or equal to a preset value.

* * * * *